INVENTOR.
Clarence E. Reed
BY
Ira L. Nickerson
ATTORNEY.

Patented Feb. 28, 1933

1,899,771

UNITED STATES PATENT OFFICE

CLARENCE E. REED, OF WICHITA, KANSAS, ASSIGNOR TO CHICAGO PNEUMATIC TOOL COMPANY, OF NEW YORK, N. Y., A CORPORATION OF NEW JERSEY

BLADE TYPE BIT

Application filed August 5, 1929. Serial No. 383,707.

This invention relates to apparatus for earth boring with particular reference to bits of the blade type for use with rotary equipment in drilling oil and water wells.

One object of the invention is to reduce the extent of the working edge which is in direct contact with the material so as to facilitate penetration. Another object is to effect rapid "gouging" of the material when relatively soft formations are encountered. Another object is to prevent "drag" on the bit when the gouging members are sunk in the material. Other objects will be apparent from the detailed description which follows.

The bit of the present invention is provided with cutting edges which are stepped to form horizontal stages of cutting zones with wide and deep grooves leaving a series of individual teeth. Each tooth may be described as a segment of a circle when viewed in plan and is made strong by making it longer in a rotary sense than the tooth is wide on its cutting face or edge. The end of the tooth adjacent the cutting edge may be arched or concaved so that contact with the material is made only with the advancing edge which tends to cut cleanly and to be self-sharpening. The sides of the teeth are bevelled or tapered rearwardly to eliminate "drag" when sunk in the material. The arrangement of teeth is such that there is initial penetration by stepped gouging teeth which rest upon the bottom of the hole, the most advanced teeth being arranged to cut the periphery of the drill hole at diametrically opposite points. Following them in a rotary sense are clean-up teeth on still higher horizontal planes to remove the material left by the grooves in the cutting teeth. Reaming wings on a still higher level maintain the gauge of the hole. The bit is designed for deep and fast penetration by forming all of the cutting teeth on narrow radiating parts. Flushing fluid is discharged axially as a jet partly confined and directed by the inmost teeth directly upon the bottom of the hole.

In order to illustrate the invention, one concrete embodiment thereof is shown in the accompanying drawings, in which.

Figure 1:
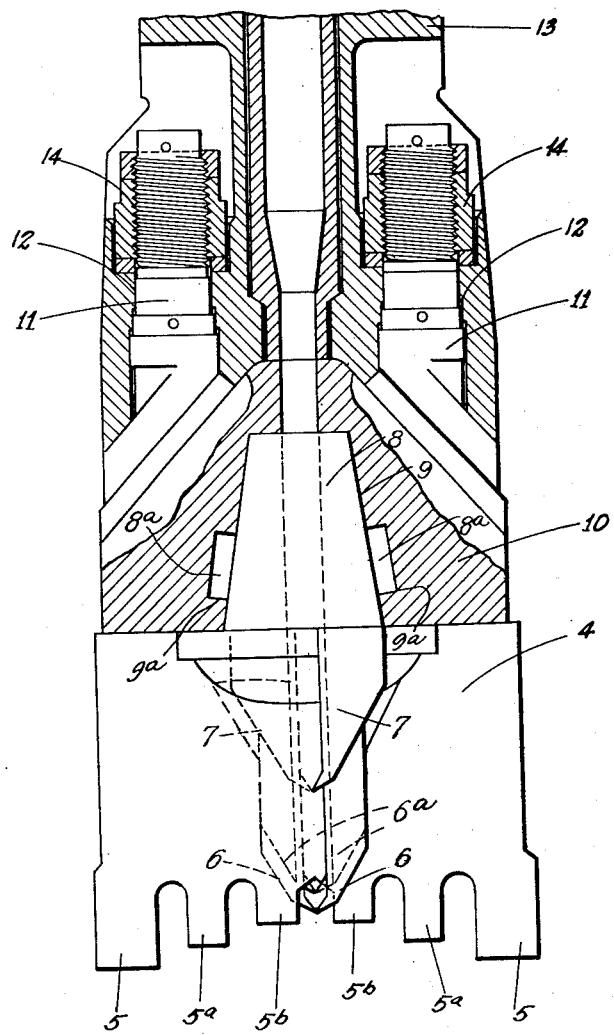
Fig. 1 is a vertical sectional view through a portion of a bit head and chuck showing in elevation a bit of the present invention mounted therein and ready for operation.

The embodiment of the invention chosen for the purpose of illustration consists of a bit having a body 4 of substantial size provided at its lower end with stepped and spaced gouging teeth 5, 5a and 5b extending diametrically across the lower portion thereof, the outer teeth 5 having the greatest projection into the material to be drilled and the teeth 5a and 5b being of less projection or on upwardly stepped levels as the axis of the bit is approached. In the vertical plane which is transverse or at right angles to the plane of the gouge teeth 5, 5a and 5b, are disposed the clean-up teeth 6 and 6a which like the gouging teeth are separated by wide and deep grooves. The clean-up teeth are at a higher level than the gouging teeth as clearly indicated in Figs. 1 and 2, the inmost clean-up teeth 6a being upwardly stepped relative to the outer teeth 6. In position, in a rotary sense, the clean-up teeth 6 and 6a correspond to the spaces between gouging teeth 5 and 5a and 5a and 5b respectively as will be evident from an inspection of Fig. 3. At a still higher level but in the same plane as clean-up teeth 6 and 6a are reaming teeth 7 which cooperate with the outer gouging teeth 5 to maintain the gauge of the hole.

Figure 3:
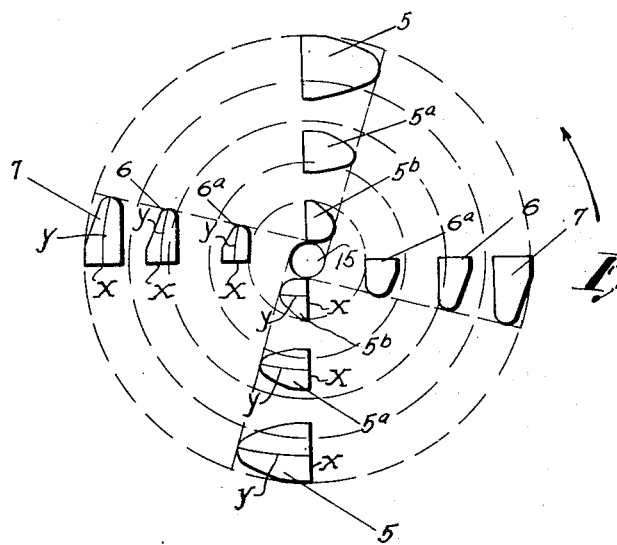
Fig. 3 is a diagrammatic view illustrating the relative positions, spacing and shape of the cutting, "clean up", and reamer teeth on the bit.

The relative positions as well as the general form of all the teeth heretofore described are clearly indicated in the diagrammatic view Fig. 3. Each tooth may be likened to the segment of a circle when viewed from below as in Fig. 3 on a plane which is perpendicular to the axis of the bit head. Each tooth may be strengthened by making it longer in a rotary sense, i. e. along the line $y$, than its cutting face or edge $x$ is wide. In addition the sides as they project rearwardly from cutting edge $x$ are bevelled or tapered to give clearance when the teeth are sunk in the formation so that the sides of the teeth are not subject to "drag" as the bit is rotated.

Figure 2:
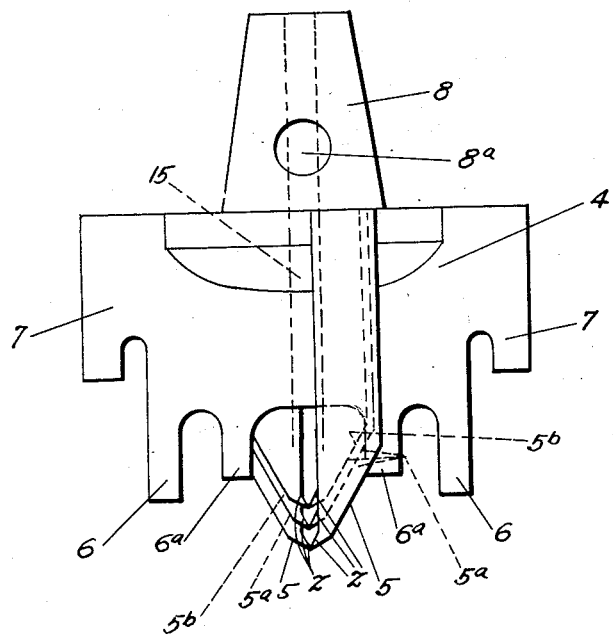
Fig. 2 is a side elevational view of the bit alone after being rotated 90° from the position shown in Fig. 1.

As clearly indicated in Fig. 2, gouging teeth 5, 5a and 5b toward their lower ends are arched or concaved at z to further strengthen the teeth which first engaged the formation and to provide an advancing edge for line contact with the same. With this form of tooth wear tends to maintain it in a sharp condition.

The upper portion of the bit may be made of any suitable form for convenient attachment to the rotary drill stem. Hence, it may be made with a tapered and coarse threaded projection to screw into the lowermost section of the drill stem. By preference, however, projection 8 is polygonal in shape to fit the socket 9 provided by the cooperating chuck members 10 shown in Fig. 1 and disclosed and claimed in my copending application Serial No. 323,273, filed December 3, 1928. These chuck members have shank portions 11 which extend into axial sockets 12 in a one piece bit head 13 of the type disclosed and claimed in Letters Patent of the United States granted to me on July 19, 1927, Numbers 1,636,665; 1,636,666; 1,636,667 and 1,636,668, shanks 11 being secured in place by nuts 14 engaging the threaded upper ends of the same. Transverse extensions 8a are provided on projection 8 to cooperate with side recesses 9a in chuck members 10 securely to maintain bit 4 in chuck assembly 10. An axial bore 15 connecting with the water course in the drill head and drill stem discharges flushing fluid at the center of the bit with the result that it flushes all the teeth since it must cross them to reach the side walls of the hole.

It is to be noted that in all the bits of the general class of blade type cutters, the flushing stream moves downward axially of the drill stem to the bit. There the exits are holes at some angle—not axially. These angularly disposed exits cause the fluid to jet the side of the bore hole, or the jets are obliquely downward and at some distance above the actual surface being cut, so that the jets play on a stiff mass of disintegrated earth formation, and it has been the theory that the mass was churned by the blade in the fluid until dissolved enough to be floated out. Such jets, by one of the first laws of motion, cause a constant pressure sidewise from the reaction or rebound of the jet to push the bits in use heretofore out of a vertical path; and thus cause crooked holes. One of the prime objects of this invention is to make a straight hole by utilizing the hydraulic action of the fluid under heavy pressure of the pumps and control it axially downward to cut the bottom of the hole at its center by the jet. The spaced teeth are deeply forced by the drill stem weight into the soft earth formations in which this type bit is exclusively employed to disintegrate and trim the cavity formed at the center by the jet, and the teeth are so placed as to steady and hold the bit about the vertical axis. Hence, this invention will make a straight hole.

From the above it will be apparent that the wide spacing and step arrangement of the gouging and clean-up teeth permits deep penetration and effective gouging action when the bit is in use. The formation and positioning of the teeth, as clearly indicated in Fig. 3, is such as to cause the bit to dislodge the material from the full area of the hole. The rearward tapering of the sides of the teeth prevents drag of the material on the bit, and the arching or hollowing of the forward portion of the gouging teeth to present an advancing edge tears out the material and tends to provide a stronger tooth and to maintain the same in a sharp condition.

While the invention has been herein disclosed in what is now considered to be its preferred form, it is to be understood that the invention is not limited to the specific details thereof but covers all changes, modifications, and adaptations within the scope of the appended claims.

I claim as my invention:

1. An earth boring bit for rotary drilling designed for deep and fast penetration having a transverse row of stepped and spaced teeth with wide and deep grooves therebetween for initially engaging the formation, a second transverse row of stepped and spaced clean-up teeth at right angles to said first row for cutting out the material left by the teeth of said first row, the outer teeth of both said rows being of greatest forward projection and the other teeth of both said rows being of less forward projection as the vertical axis of the bit is approached, and reaming wings for maintaining the gauge of the drill hole, said wings being disposed in the transverse plane of said row of clean-up teeth but at a higher horizontal level than any of said clean-up teeth.

2. An earth boring bit for rotary drilling designed for deep and fast penetration having stepped and spaced teeth disposed at its forward end in a transverse row, said teeth diverging as to length outwardly and forwardly from the axis of the bit, the marginal ones of said teeth having the greatest forward projection and defining the diameter of the drill hole, stepped and spaced clean-up teeth disposed at an angle of rotation to said first named teeth for removing the material left by the spaces between said first named teeth, and reaming wings at a higher level than all of said teeth but having the same radial projection as said marginal ones of said first named teeth for maintaining the gauge of the hole as the latter become worn.

3. An earth boring bit for rotary drilling designed for deep and fast penetration having a transverse row of stepped and spaced teeth with wide and deep grooves therebetween for initially engaging the formation, a second transverse row of stepped and spaced clean-up teeth at right angles to said first row for cutting out the material left by the teeth of said first row, the outer teeth of both said rows being of greatest projection and the other teeth of both said rows being of less projection toward the axis of the bit, each tooth of both rows having a broad cutting face and its rearwardly extending portion tapered to prevent "drag" by the formation being drilled, said bit having an axial water course opening at the intersection of said rows of teeth whereby the jet of flushing fluid is at least partly confined and directed to the bottom of the hole by the adjacent teeth of both said rows.

Signed by me at Wichita, in the county of Sedgwick and State of Kansas, this 1st day of August, 1929.

CLARENCE E. REED.